United States Patent
Aurongzeb et al.

(10) Patent No.: US 10,482,810 B2
(45) Date of Patent: Nov. 19, 2019

(54) INTEGRATED FOLDED OLED DISPLAY IN AN INFORMATION HANDLING SYSTEM PORTABLE HOUSING FOR DISABLING PIXELS BASED UPON ANTENNA ACTIVITY

(71) Applicant: Dell Products L.P., Round Rock, TX (US)

(72) Inventors: Deeder M. Aurongzeb, Austin, TX (US); Jung-Hwan Hong, Austin, TX (US); Brian Hargrove Leonard, Austin, TX (US); Christopher A. Torres, San Marcos, TX (US); Erin K. Walline, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 15/063,650

(22) Filed: Mar. 8, 2016

(65) Prior Publication Data

US 2017/0263179 A1 Sep. 14, 2017

(51) Int. Cl.
*G09G 3/3225* (2016.01)
*H04B 7/0413* (2017.01)
(Continued)

(52) U.S. Cl.
CPC ......... *G09G 3/3225* (2013.01); *G06F 1/1637* (2013.01); *G06F 1/1643* (2013.01);
(Continued)

(58) Field of Classification Search
CPC .. G09G 3/3208; G09G 3/3225; G09G 3/2096; G09G 3/30; G09G 2320/041; G09G 2330/06; G09G 2370/16; G06F 1/1615; G06F 1/1616; G06F 1/1618; G06F 1/1633; G06F 1/1637; G06F 1/1643; G06F 1/1652; G06F 1/1683; G06F 1/1698; G06F 1/183; G06F 1/203; G06F 3/0416; G06F 1/1656;
(Continued)

(56) References Cited

U.S. PATENT DOCUMENTS 5,765,113 A * 6/1998 Russo ...................... H04B 1/38
455/296
6,381,476 B1 * 4/2002 Yoshida ................ H04B 15/04
340/7.51

(Continued)

OTHER PUBLICATIONS

Hongseok Kim et al., Energy-Efficient Adaptive MIMO Systems Leveraging Dynamic Spare Capacity, 2008. CISS 2008, 42nd Annual Conference on Information Sciences and Systems, Mar. 19-21, 2008, pp. 68-73.

(Continued)

*Primary Examiner* — Keith L Crawley
(74) *Attorney, Agent, or Firm* — Zagorin Cave LLP; Robert W. Holland

(57) ABSTRACT

A portable information handling system display integrates a MIMO antenna configuration that cooperates with a radio to adapt display operations for supporting wireless communication. For example, plural antenna nanowires integrated with display pixel control wires selectively interface with a MIMO radio with the antenna wires selected based upon display operational characteristics, such as the presentation of visual information at the display and the enablement or disablement of touch detection circuits.

7 Claims, 9 Drawing Sheets

(51) Int. Cl.
*G06F 1/20* (2006.01)
*G06F 3/041* (2006.01)
*G09G 3/20* (2006.01)
*G06F 1/16* (2006.01)
*G06F 1/18* (2006.01)
*H01Q 1/22* (2006.01)
*H01Q 21/28* (2006.01)

(52) U.S. Cl.
CPC .......... *G06F 1/1656* (2013.01); *G06F 1/1698* (2013.01); *G06F 1/183* (2013.01); *G06F 1/203* (2013.01); *G06F 3/0416* (2013.01); *G09G 3/2096* (2013.01); *H01Q 1/2266* (2013.01); *H01Q 21/28* (2013.01); *H04B 7/0413* (2013.01); *G09G 2320/041* (2013.01); *G09G 2370/16* (2013.01)

(58) Field of Classification Search
CPC .. G06F 1/1677; H01Q 1/2258; H01Q 1/2266; H01Q 1/2291; H01Q 1/243; H01Q 21/28; H01Q 21/29; H04B 1/3833; H04B 1/3838; H04B 7/04; H04B 7/0413; H04B 7/02
See application file for complete search history.

(56) References Cited

U.S. PATENT DOCUMENTS

| | | | |
|---|---|---|---|
| 7,159,646 B2 | 1/2007 | Dessiatoun et al. | |
| 8,305,728 B2 | 11/2012 | Lee et al. | |
| 8,405,308 B2 | 3/2013 | Matsudate et al. | |
| 8,467,168 B2 | 6/2013 | Honer et al. | |
| 8,824,142 B2 | 9/2014 | Jewell-Larsen et al. | |
| 9,119,330 B2 | 8/2015 | Hubbard et al. | |
| 9,178,572 B1* | 11/2015 | Zhang | H01Q 1/44 |
| 2003/0203245 A1 | 10/2003 | Dessiatoun et al. | |
| 2007/0287503 A1* | 12/2007 | Ying | H01Q 1/1271 |
| | | | 455/566 |
| 2009/0080157 A1 | 3/2009 | Varadarajan et al. | |
| 2011/0085301 A1 | 4/2011 | Dunn | |
| 2012/0162040 A1* | 6/2012 | Taura | G06F 1/1698 |
| | | | 343/770 |
| 2013/0241864 A1* | 9/2013 | Chen | G06F 3/0418 |
| | | | 345/174 |
| 2014/0045424 A1* | 2/2014 | Fratti | H01Q 1/44 |
| | | | 455/41.1 |
| 2014/0087658 A1* | 3/2014 | Hou | G06F 3/041 |
| | | | 455/41.1 |
| 2014/0106684 A1* | 4/2014 | Burns | H01Q 1/243 |
| | | | 455/78 |
| 2014/0128032 A1* | 5/2014 | Muthukumar | H01Q 3/00 |
| | | | 455/411 |
| 2014/0340347 A1* | 11/2014 | Tenuta | G06F 3/0416 |
| | | | 345/174 |
| 2015/0036760 A1 | 2/2015 | Pang et al. | |
| 2015/0237761 A1 | 8/2015 | Dunn | |
| 2017/0104855 A1* | 4/2017 | Lee | G06F 1/165 |
| 2017/0179567 A1* | 6/2017 | Zou | H01Q 1/22 |

OTHER PUBLICATIONS

Dinesh Bharadia et al., Full Duplex MIMO Radios, 11th USENIX Symposium on Networked Systems Design and Implementation (NSDI 14), Apr. 2014, http://web.stanford.edu/~skatti/pubs/nsdi14-mimo.pdf.

* cited by examiner

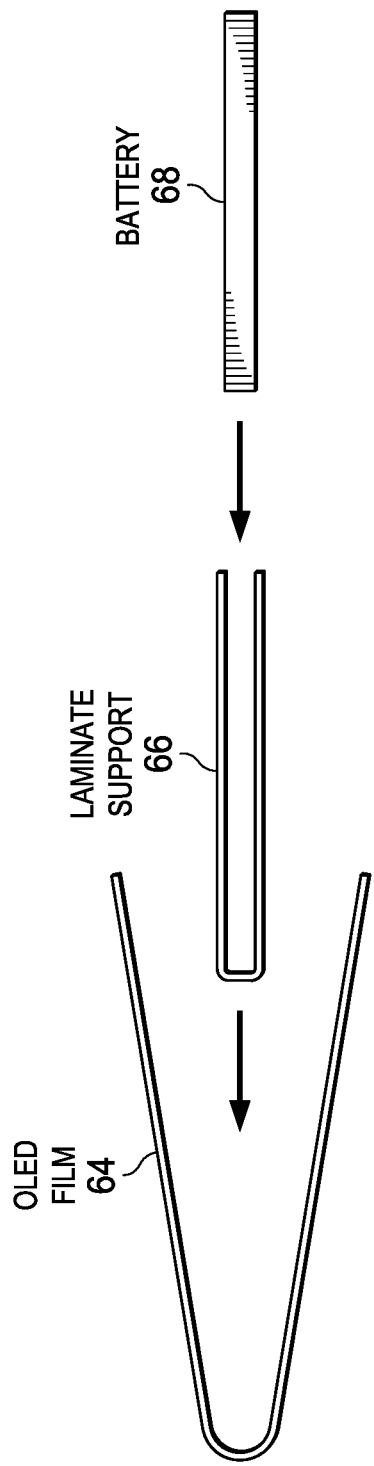

INTEGRATED FOLDED OLED DISPLAY IN AN INFORMATION HANDLING SYSTEM PORTABLE HOUSING FOR DISABLING PIXELS BASED UPON ANTENNA ACTIVITY

BACKGROUND OF THE INVENTION

Field of the Invention

The present invention relates in general to the field of information handling system portable housings, and more particularly to an integrated folded OLED display in an information handling system portable housing supporting peripheral functions.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems continue to shrink in size and increase in capability. End users appreciate small portable systems that readily travel so that end users can access information on-the-go. Although decreasing sizes of portable information handling systems has resulted from a confluence of factors, one driving factor is the shrinking size of display devices and the graphics processing subsystems that generate visual images at graphics devices. Portable information handling system housing size is typically determined by the size of the flat panel display integrated in the housing. Generally end users select a system based upon the length and width of the display. Once an end user selects a display size, the user typically can select a particular system based on processing capability and thickness. Generally, end user's prefer information handling systems that have less thick profiles, however, smaller housings tend to have less room for powerful processing components and the thermal constraints often associated with greater processing speeds.

Generally portable information handling systems have integrated flat panel liquid crystal displays (LCDs) to present information as visual images. LCDs present visual images by filtering light provided by a backlight through liquid crystals that change their filter characteristics based on a signal driven by a timing controller and pixel values provided from a graphics system. Over the past several years, the thickness of LCDs has decreased as the size of backlights has shrunk, such as with the transition from fluorescent to light emitting diode (LED) backlight sources. More recently, flat panel display devices have benefited from the introduction of organic light emitting diode (OLED) display devices. OLED displays apply current to an emissive electroluminescent layer of organic compound that emits red, green and blue light in proportion to the drive current. Since OLED displays do not use a backlight, the thickness of the display tends to be less. Indeed, OLED displays apply to a substrate as a film that folds and bends so that OLED displays may have a form factor that bends to adapt to a housing shape.

One difficulty associated with OLED displays is ensuring that the display film has adequate structural support that takes advantage of the low form factor available from conformable OLED display films. Information handling systems often integrate a number of different hardware devices along with a flat panel display structure that can tend to increase overall housing thickness. Some examples include a touch functionality that detects touch inputs made at a display screen, such as a thin film transistor (TFT) touch detection system; an antenna that supports WiFi and other radio transmissions; a camera that captures images in the proximity of the display, etc. In addition to size constraints introduced by low form factor housing designs, the tight fit of multiple components within a thin housing structure often introduces interference from unintended emissions due to the close proximity of components to each other. Another difficulty associated with OLED displays is that the generation of light creates thermal energy as a byproduct. Excess thermal energy generally must be removed so that components near the OLED display do not suffer damage. In systems that have thin form factors, thermal dissipation presents a difficulty where airflow is constrained by tight housing constraints. Thermal dissipation issues tend to increase where OLED films conform to bent housing shapes, such as where an OLED film folds over a housing edge or is integrated on both sides of a housing.

SUMMARY OF THE INVENTION

Therefore, a need has arisen for a system and method which provides an information handling system low profile housing having an integrated OLED film display that supports peripheral functions.

A further need exists for a system and method which provides thermal dissipation for a low profiles housing that integrates one or more OLED film displays.

In accordance with the present invention, a system and method are provided which substantially reduce the disadvantages and problems associated with previous methods and systems for integrating folded OLED displays into an information handling system housing.

More specifically, a portable information handling system housing integrates an OLED display having front and rear faces for two-sided presentation of visual images. A laminated substrate support disposed between the OLED films provides housing stiffness and includes thermal material to aid in removal of excess thermal energy between the OLED films, such as copper, graphite or graphene laminated to an Aramid material. Air channels formed in the support, protective glass and/or other structure defines a cooling air path that aids in removal of excess thermal energy through a cooling airflow. For example, a piezoelectric device interfaces with the cooling air path to force cooling airflow around the periphery of the OLED film. In one embodiment, cooling air paths are defined for front and rear faces of the display with cooling airflow provided to each face in opposing directions. Peripheral device support is integrated in the display structure, such as by integrating a camera module with a midframe support of in a glass cover. Wireless communication support is provided by antenna wires integrated within an OLED film, such as silver nanowires that run parallel to OLED pixel control wires. Placing multiple antenna wires within an OLED film at various positions allows selective engagement of the antenna wires by a wireless network interface card to optimize data transfer rates, such as by arranging selection of antenna wires to provide a MIMO radio configuration. Display touch and image presentation configurations are adjusted to adapt to desired data transfer rates, such as by turning off touch and display functions in the proximity of selected antenna wires as needed to provide a desired data rate having less impact from display and touch function-related interference.

The present invention provides a number of important technical advantages. One example of an important technical advantage is that a minimum foot print two-sided OLED display presents visual images at a portable information handling system while supporting peripheral functions, such as camera operation and wireless network communications. Thermal energy from two OLED films in close proximity to each other is removed by applying a cooling airflow to the outer periphery of the OLED films, such as with cooling airflow channels etched in support substrate, protective glass and/or bezel and interfaced with a cooling air source, such as piezoelectric device. An inner midframe supports the OLED films with desired stiffness provided by an Aramid and copper laminate that further promotes transfer of thermal energy. Antenna wires embedded in OLED film and running parallel with display control wires support wireless communication with configurable antenna positions, such as to support MIMO radio communications. Minor adjustments to display configurations in the proximity of active antenna wires help to obtain data rates having sufficient bandwidth as needed by varying system operations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts one embodiment of a two-sided OLED display that integrates into a portable information handling system;

DETAILED DESCRIPTION

A portable information handling system having a two-side OLED display integrates cooling and wireless communication proximate to the integrated OLED display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
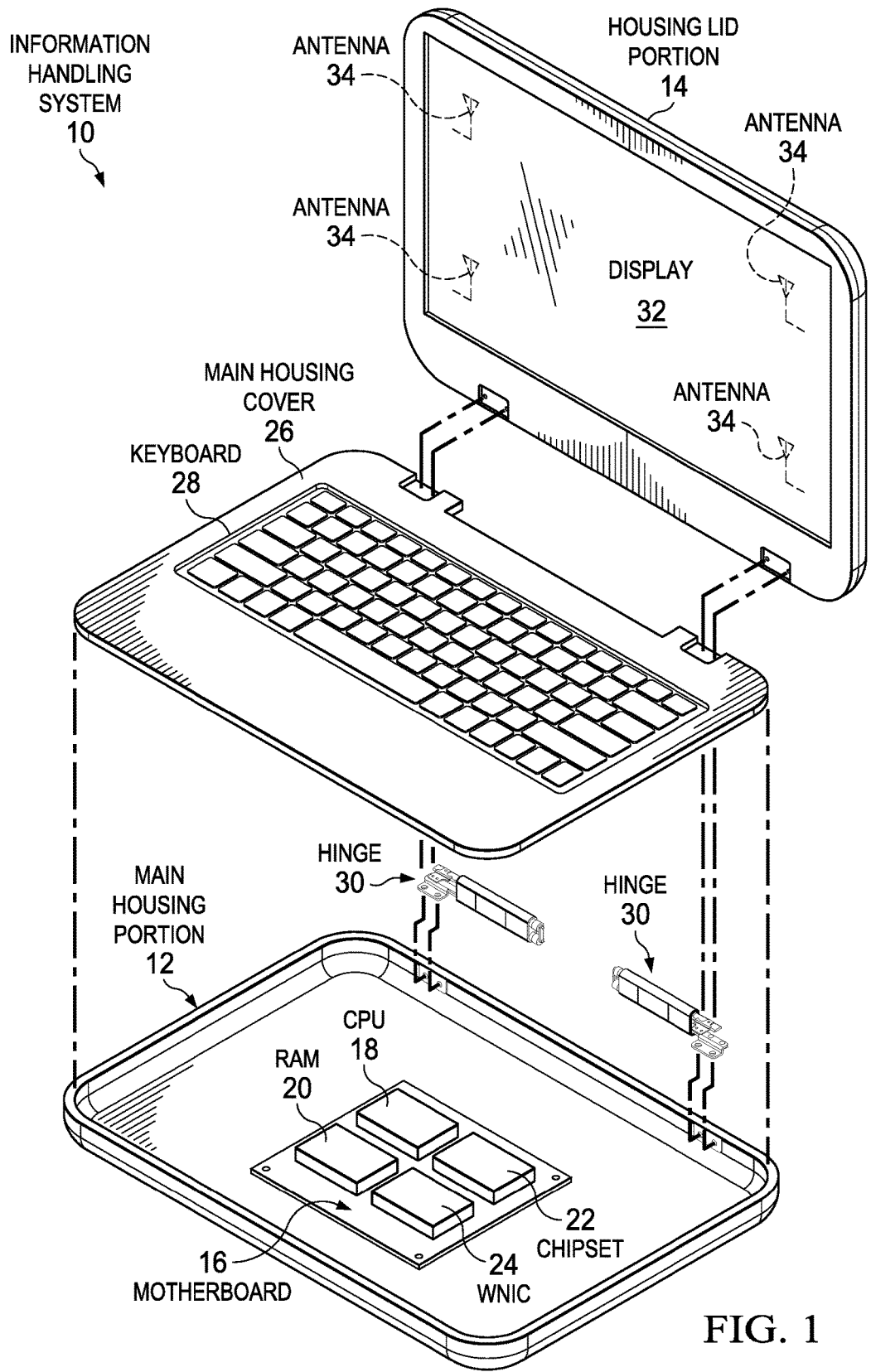
FIG. 1 depicts a blown-up view of an example embodiment of a portable information handling system 10 having plural antenna disposed proximate an integrated display.

Referring now to FIG. 1, a blown-up view depicts an example embodiment of a portable information handling system 10 having plural antenna 34 disposed proximate an integrated display 32. Portable information handling system 10 is built in a housing having a main housing portion 12 and rotationally coupled housing lid portion 14. Main housing portion 12 includes a motherboard 16 that interfaces processing components to support information processing. In the example embodiment, a central processing unit (CPU) 18 executes instructions to process information stored in random access memory (RAM) 20. A chipset 22 includes processors, controllers and flash memory to coordinate processing of information and input and output of information with an end user. For example, chipset 22 includes a graphics processor to prepare visual information for presentation at a display 32 as visual images and an embedded controller to manage power use and input/output (I/O) functions. A wireless network interface card (WNIC) 24 interfaces with chipset 22 and includes one or more radios that support wireless communication, such as through a wireless local area network (WLAN), a wireless wide area network (WWAN) and/or a wireless personal area network (WPAN). Although the example embodiment depicts processing components in housing main portion 12, alternative embodiments may include the processing components and display 32 in a common housing as a tablet configuration.

Housing main portion 12 has a main housing cover 26 that covers the processing components and integrates a keyboard 28 that communicates inputs to chipset 22. Hinges 30 rotationally couple housing main portion 12 to housing lid portion 14 to allow rotation between closed and open positions, such as a clamshell configuration or a tablet configuration. Display 32 presents information as visual images by applying pixel values received from chipset 22 to generate the visual images with pixels. In addition, display 32 includes a touchscreen that detects touch inputs, such as a thin film transistor (TFT) active driven touchscreen. In the example embodiment, display 32 has an OLED film that generates colors at pixels by combining red, green and blue colors at each pixel as defined by the pixel values. Plural antenna wires 34 are embedded within the area of display 32 and interfaced with WNIC 24 to send and receive wireless signals for WNIC 24. As set forth in greater detail below, antenna wires 34 are selectively configured by WNIC 24 to support multiple input multiple output (MIMO) radio communications, such as with 3×3, 2×2 or 4×2 MIMO antenna configurations. MIMO radio communications provide more than one data signal on radio channels via multipath propagation to achieve high data rates by selective switching of radio signals from radios within WNIC 24 to selected of antenna wires 34. WNIC 24, chipset 22 and display 32 cooperate to configure antenna wires 34 for optimal data rates, such as by selectively deactivating pixels and touch functionality in the proximity of antenna wires 34 engaged in radio signal transmission and/or reception.

Figure 2:
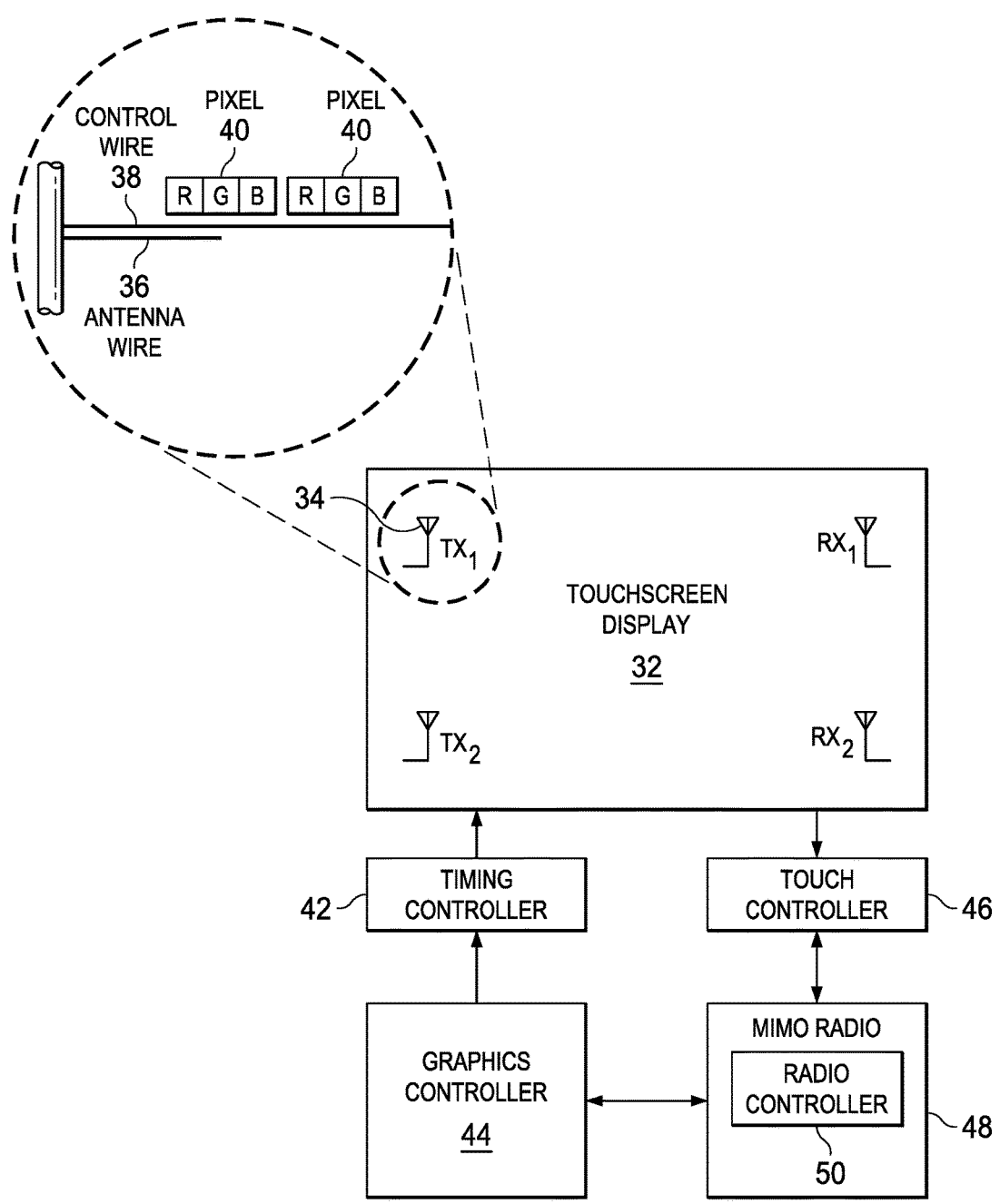
FIG. 2 depicts a block diagram of an example embodiment of the disposition and control of antenna wires to support radio communications.

Referring now to FIG. 2, a block diagram depicts an example embodiment of the disposition and control of antenna 34 to support radio communications. In the example embodiment, display 32 includes plural antenna 34 disposed at plural locations embedded within the viewing area of display 32. Control wires 38 run from a timing controller 42 to pixels 40 that each include a red, green and blue OLED material. Timing controller 42 generates a color at a pixel 40 by providing varying levels of current stimulation to each color of OLED materials within each pixel 40. The application of current generates light at each OLED material based upon pixel values provided from graphics controller 44 to timing controller 42. Antenna 34 is an antenna wire that is embedded in the display 32 image presentation area and runs in parallel with and proximate to control wires 38. For example, control wires 38 and antenna wires 36 are deposited in a flexible circuit board that supports communication between timing controller 42 and pixels 40. Antenna wires 36 are lengths of conductive material tuned to appropriate radio frequencies of MIMO radios 48 within WNIC 24, such as under the management of a radio controller 50. For example, antenna wires 36 are silver nanowire or graphene deposited during manufacture of the OLED display film. Wireless radio signals are fed to antenna wires 36 through coaxial cables or other appropriate media interfaced with display 32.

During operation of display 32, graphics controller 44, touch controller 46 and radio controller 50 cooperate to selectively configure antenna wires 36 as appropriate to support wireless communication, such as by selectively interfacing antenna wires 36 with MIMO radio 48 to support MIMO configurations. For example, graphics controller 44 determines portions of display 32 that are not actively supporting viewing of information by an end user to reduce or eliminate control signals through control wires 38 that might interfere with reception or transmission of wireless signals at antenna wires 36. Radio controller 50 receives the inactive areas from graphics controller 44 and applies the inactive areas to determine with antenna wires 36 to select for sending or receiving wireless signals. As another example, touch controller 46 determines portions of display 32 that are not actively in use by an end user for touch inputs to reduce or eliminate touch monitoring that might produce noise that interferes with receiving or sending wireless signals by antenna wires 36. Both graphics controller 44 and touch controller 46 may determine the likelihood of an end user needing a portion of display 32 based upon the position of the housing in a clamshell or tablet mode, or based upon other sensed information, such as images captured by a camera viewing the area proximate to display 32. In some instances, such as when an end user is using a data-heavy function, like video streaming, radio controller 50 may instruct graphics controller 44 and touch controller 46 regarding the portions of display 32 having antenna wires 36 that MIMO radio determines to have best data transmission rates. As appropriate, graphics controller 44 and touch controller 46 will eliminate or reduce operations proximate to selected antenna wires 36. In one example embodiment as depicted herein, display 32 is a two-sided display with an OLED film disposed on the front and rear faces of housing lid portion 14 so that selection of antenna wires 36 is based in part on which face of display 32 is actively viewed by an end user and/or which face of display 32 offers the best wireless signal transmission and/or reception.

Figure 3:
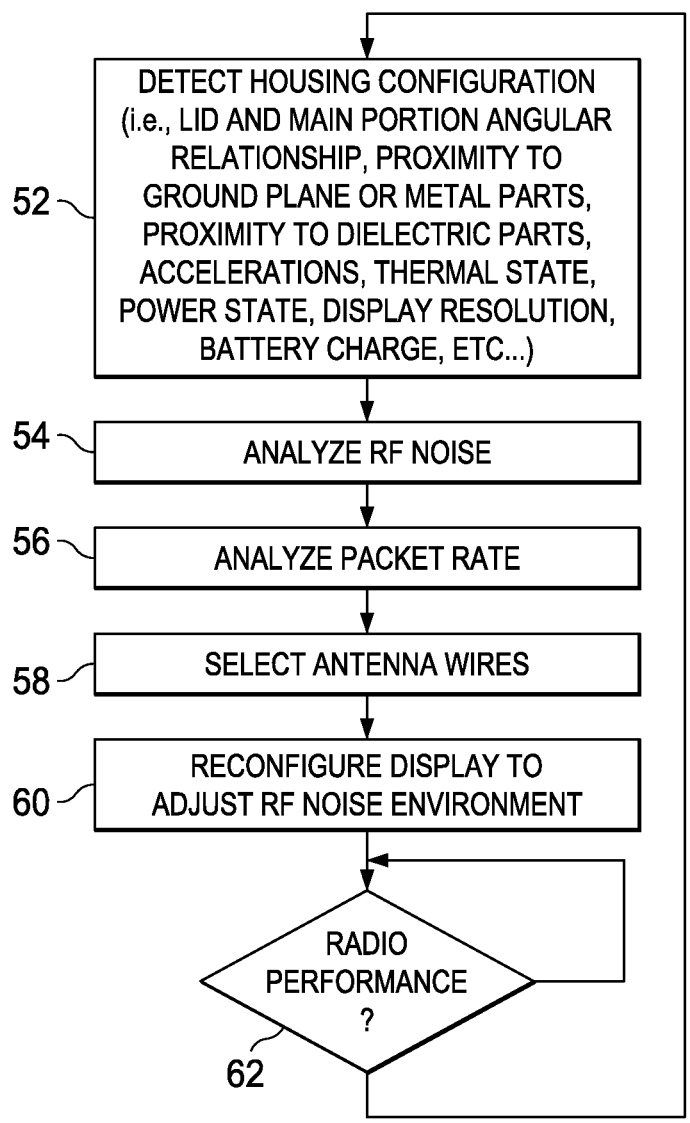
FIG. 3 depicts a flow diagram of a process for configuring an information handling system display to selectively interface embedded antenna wires with a radio for receiving and transmitting wireless signals.

Referring now to FIG. 3, a flow diagram depicts a process for configuring an information handling system display to selectively interface embedded antenna wires with a radio for receiving and transmitting wireless signals. The process begins at step 52 with detection of a housing configuration, specifically the configuration factors that may impact radio performance and antenna selection. For example, configuration factors may include main and lid portion angular relationships (i.e., closed, clamshell or tablet positions), proximity of the housing to a ground plane or metal parts (i.e., by monitoring captured camera images), proximity of the housing to dielectric parts, movement of the housing (i.e., as detected by accelerometers), housing thermal state (i.e., as detected by thermal sensors), system power state (i.e., on, standby, external power, battery power, battery charge, etc . . . ) and display resolution capability and settings. At step 54, an analysis is performed of radio frequency noise present at the display, such as might be introduced by TFT touch detection or presentation of images at OLED pixels by stimulation of OLED material. For example, a radio interfaces with each of the plural antenna wires in turn to listen for RF noise at each antenna wire and compares the RF noise at each antenna wire to determine the antenna wires having the best available signal for receiving and transmitting wireless signals. At step 56, an analysis is performed to determine the packet rate or bandwidth in use by the radio. For instance, during periods of time with minimal wireless interactions, low antenna performance may be acceptable so that touch and information presentation at the display are left unaltered. At other periods of time, such as during video streaming, high data rates may be required so that limited touch and display functionality in the location of an active antenna wire is acceptable. At step 58, antenna wires are selected to support radio communications based upon the determined available antenna performance and the determined need for data transfer. At step 60, display characteristics are reconfigured to adjust the display to adapt to the determined RF noise environment and system data transfer needs, such as by turning off touch and display functionality that disrupts embedded antenna performance. At step 62 a determination is made of whether radio performance is sufficient compared with display configuration. If evaluation of radio performance and display configuration are appropriate, the process to step 52 to re-evaluate system configuration.

Referring now to FIG. 4, a side view depicts one embodiment of a two-sided OLED display that integrates into a portable information handling system. Two difficulties that tend to arise with a folded OLED display are adequate stiffness of the supporting substrate for the OLED display and heat dissipation for thermal energy generated in the space between front and rear OLED display films. The example embodiment of FIG. 4 depicts an arrangement of a support substrate that provides stiffness and thermal dissipation. An OLED film 64 interfaces with a graphics processor to present visual images on front and rear faces by folding over a laminate support 66. Laminate support 66 is formed from a folded copper foil laminated with an Aramid (i.e., Kevlar) layer, such as a 100 um thick copper foil. For example, the copper and Aramid foil is thermoformed into a contiguous piece with a 0.2 mm thickness. In alternative embodiments, a graphene layer may be used instead of copper. A battery 68 inserts into the middle of laminate support 66 to provide additional stiffness for the display assembly. An OLED film 64 folds around the laminate support 66 and battery 68 assembly and interfaces with thermally conductive adhesive to laminates support 66 to aid in dissipation of excess thermal energy.

One goal of a laminated support 66 is to pass a center deformation test when a press is made at a center portion of a display. In various example embodiments, deflection depends in part on slight changes in OLED thickness. In one example 200 mm display, OLED film thickness of approximately 0.6 to 0.8 mm provides an optimal deformation result. Deflection of approximately one-half mm was experienced for thick OLED films of 0.6 to 0.8 mm while OLED thicknesses of 0.4 mm produced deflection of approximately 3 mm and OLED thicknesses of 0.1 mm had deflection of 36 mm. An outer layer of Gorilla glass provides some additional deflection resistance, however, the impact of outer protective glass surfaces was minimal relative to the impact of OLED film thickness.

Figure 5A:
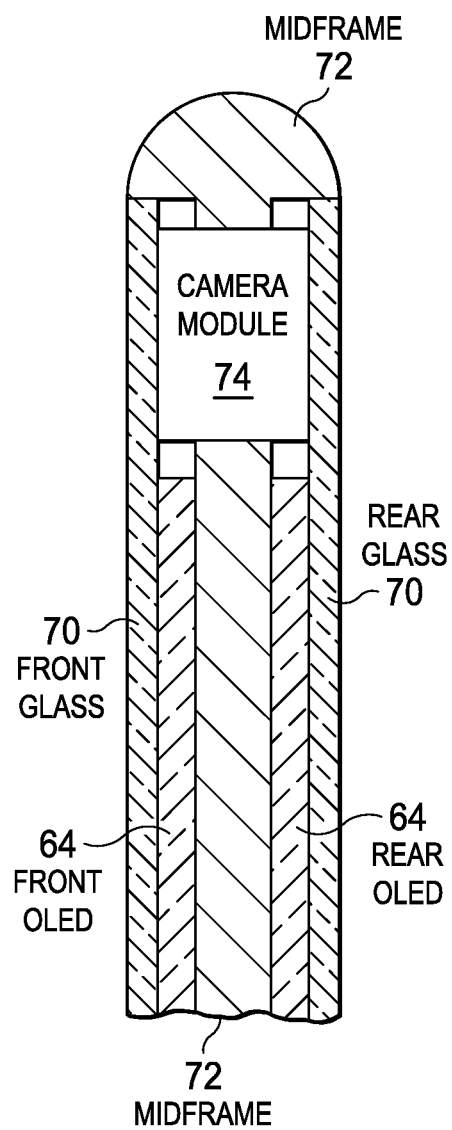
FIGS. 5A and 5B depict an example embodiment of a two sided OLED display having an integrated camera and cooling.
Figure 5B:
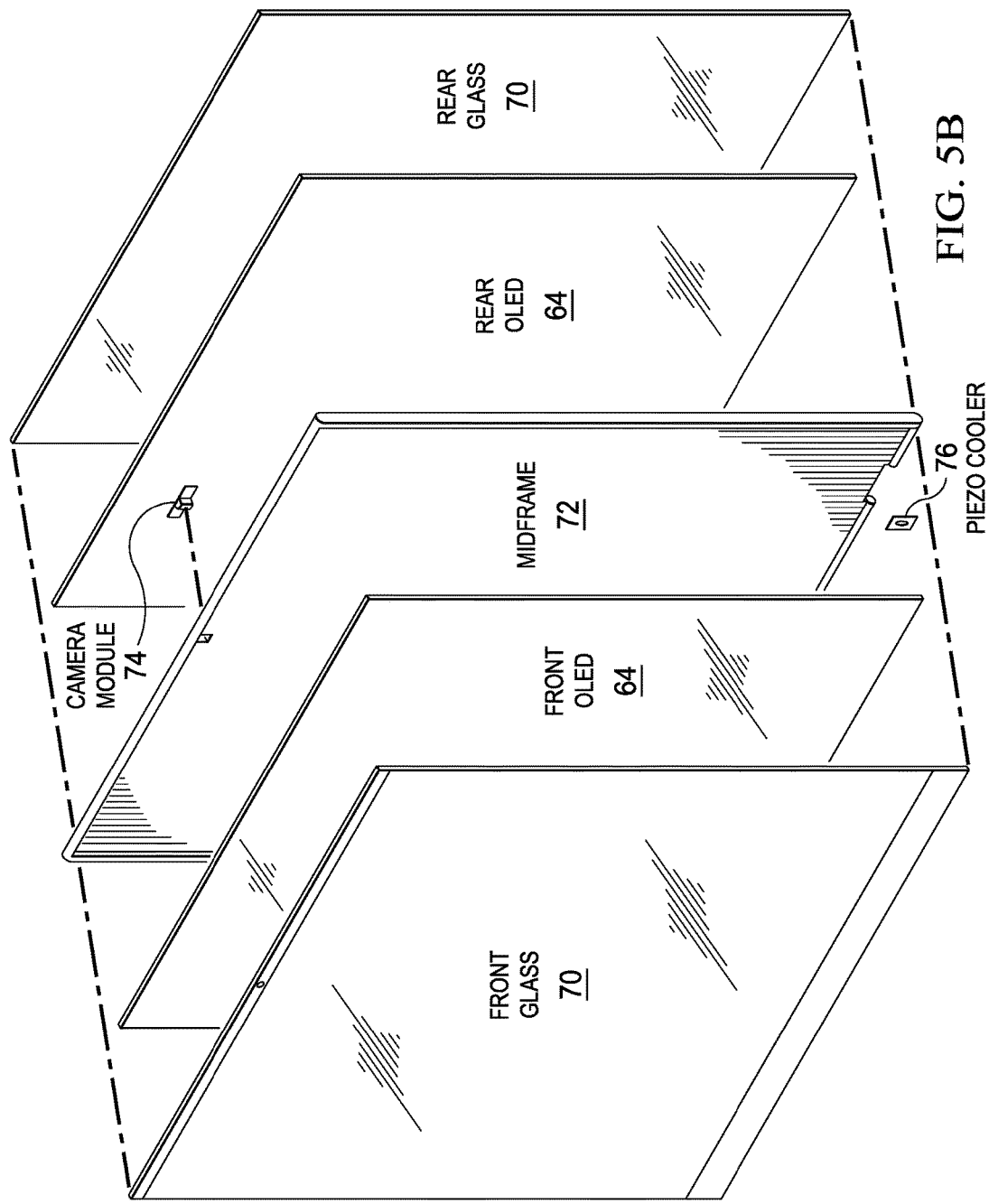

Referring now to FIG. 5A, a side view depicts an OLED display 32 having an integrated camera 74. Camera module 74 integrates with OLED display 32 at a midframe 72 to help provide stiffness to support display 32. For example, a camera module 74 included with laminate support 66 adds physical support to support 66 without interfering with front and rear OLED films 64. In alternative embodiments, camera module 64 may integrate with front or rear glass 70 to fit over OLED film 64. FIG. 5B depicts a blown up view of display 32 having camera module 74 disposed between midframe 72 and OLED film 64. In addition, FIG. 5B depicts a piezoelectric cooling device disposed at a base of display 32. As set forth in greater detail below, piezoelectric cooling device 76 generates an airflow within display 32 to remove excess heat energy generated between OLED films that present images on opposing faces of display 32. Although the example embodiment depicts front and rear glass 70, in alternative embodiment other types of protective covers may be used, such as ceramic, glass polymer composites, PMMA sapphire or other appropriate material.

Figure 6:
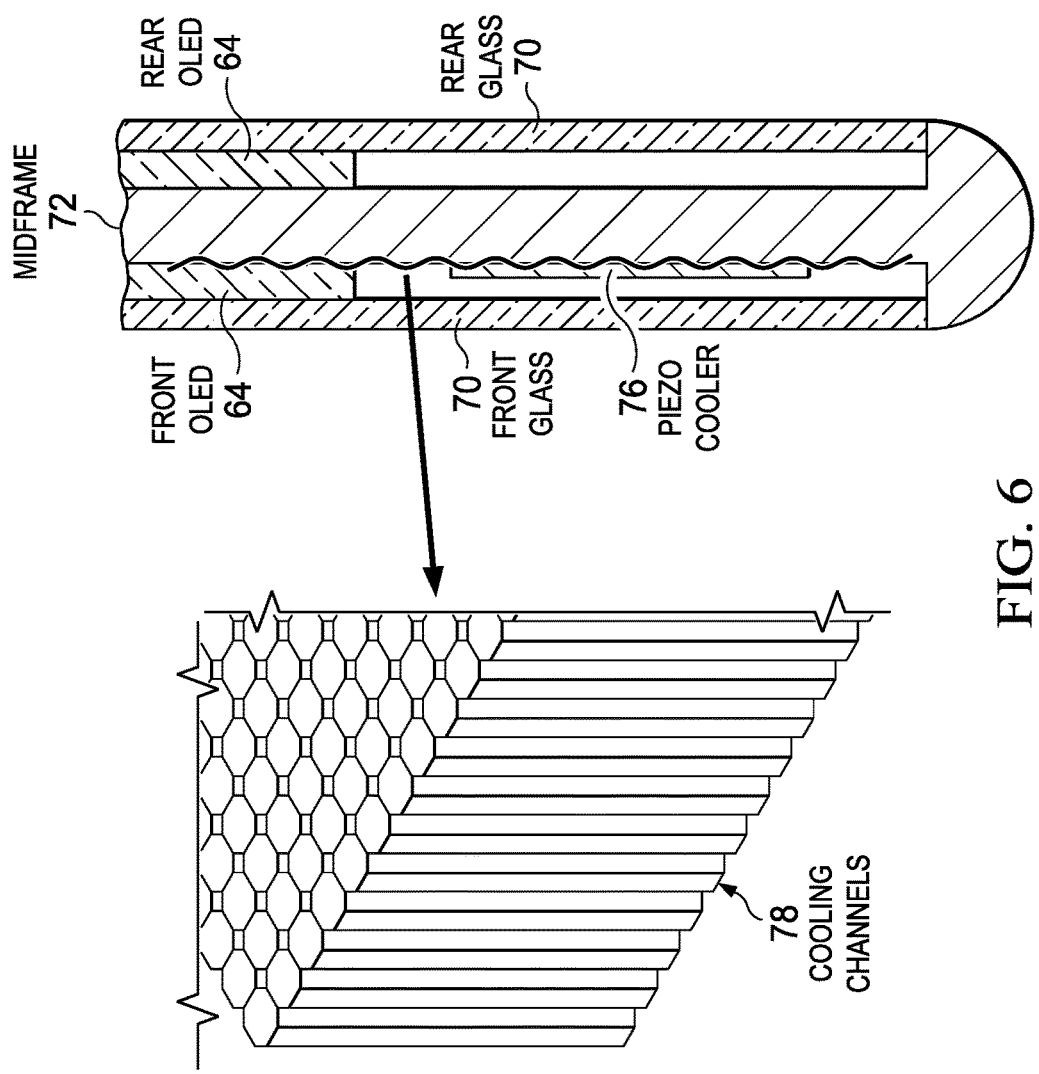
FIG. 6 depicts a side view of a display having a piezoelectric cooling device with cooling channels integrated in the display support midframe.

Referring now to FIG. 6, a side view of a display 34 having a piezoelectric cooling device 76 is depicted with cooling channels 78 integrated in the display support midframe 72. As the overall height of display 32 decreases, the space between front and rear OLED films 64 decreases so that excess thermal energy released by operation of OLED films 64 increases the temperature within display 32. OLED films 64 tend to degrade in the presence of excess thermal energy. To prevent excessive temperatures within display 32, cooling channels 78 are formed in one or more display structures to channel cooling airflow around the OLED film. In the example embodiment of FIG. 6, cooling channels 78 are etched in outer glass coverings 70 and interfaced with a piezoelectric device 76 that generates a cooling airflow to pass through the cooling channels. In addition, an infrared coating or other thermal insulator is disposed on midframe 72 to block or otherwise minimize thermal transfer between opposing OLED display devices. In various embodiments, cooling channels 78 may be formed in various display structures and placed to transfer thermal energy from various locations of display 32. For example, cooling channels 78 may be formed in midframe 72 to transfer energy from a copper substrate support material, or may be formed in an outer bezel structure that captures the outer perimeter of OLED films 64. In various embodiments, various types of piezoelectric devices may be used to generate airflow, such as various piezoelectric actuators, piezoelectric bellows, ionic wind devices and similar low power and small sized devices.

In one alternative embodiment, channels 78 includes a phase change material (PCM) disposed in the channel space. For example, the PCM couples the structure having channels 78 to another portion of information handling system 10, such as the chassis or a bezel. PCM is prepared with a carrier fluid, such as water or a water glycol mixture and then put in desired locations to aid coupling of structures to each other. PCM generally have a high heat of fusion to melt and solidify at target temperatures to store and release thermal energy with phase change activity. PCM provide a latent heat storage that helps to absorb excess thermal energy during times of increased thermal conditions and releases the excess thermal energy when thermal conditions decrease. In one example embodiment, piezoelectric devices intermittently or periodically change the direction of air flow through channels 78 as needed to maintain PCM in a constant thermal state at both the entrance and exit of airflow through channels 78. For example, the PCM has a phase change slurry composition that maintains a thermal state at a melting-enthalpy of the PCM. By monitoring the thermal state within channels 78 and alternating the direction of airflow in channels 78, a mostly uniform temperature distribution is maintained across the display 32 within temperature constraints that aid OLED film longevity. Since PCM will tend to maintain a constant temperature around the phase transition thermal level, airflow temperature exiting from air channel 78 provides feedback for turning on and off the piezoelectric device for cooling while maintaining acceptable thermal conditions within a display 32. For example, the piezoelectric device or other device that provides cooling airflow is cycled on upon detection of a temperature that exceeds the thermal condition at which phase change takes place.

Figure 7:
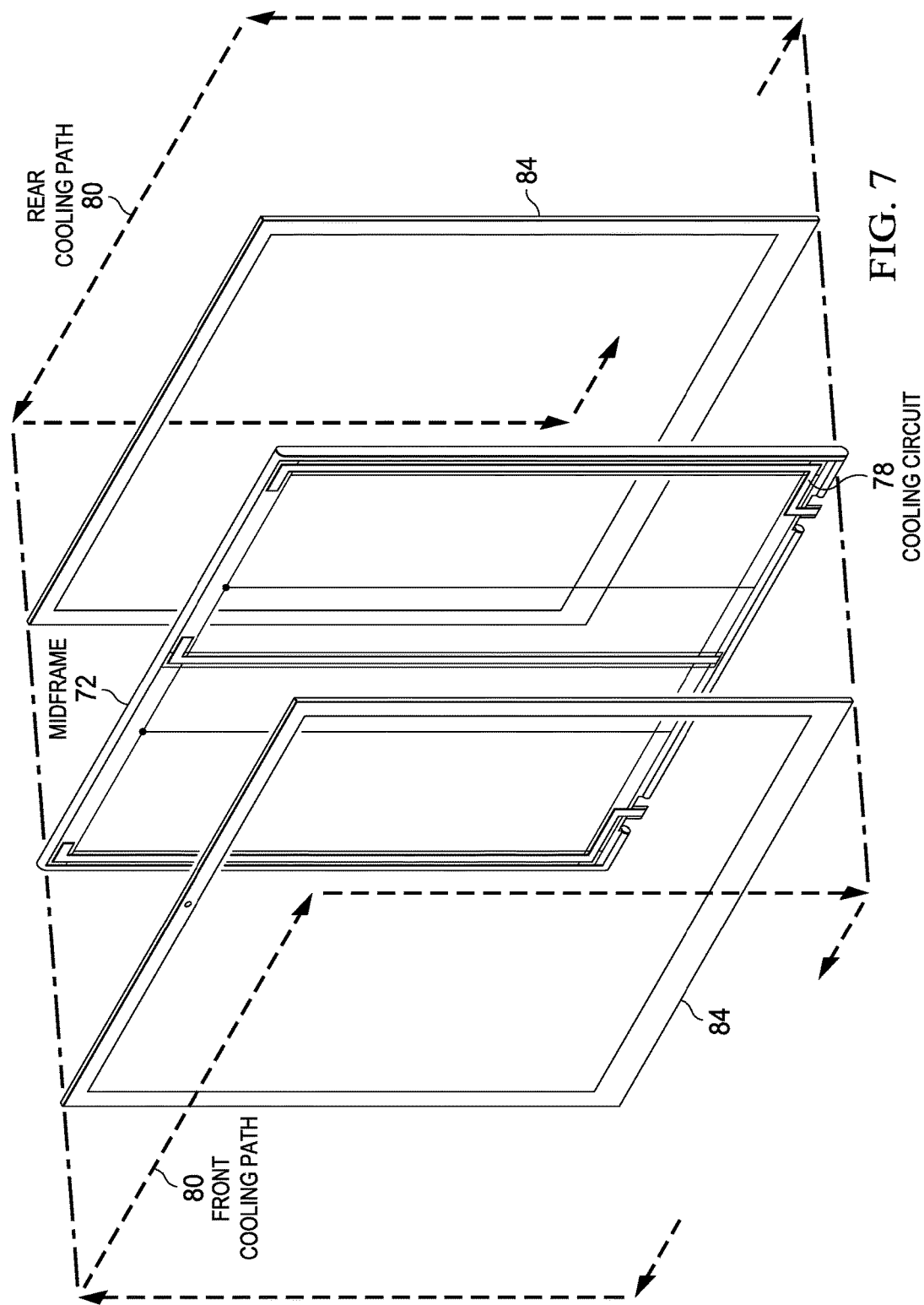
FIG. 7 depicts a blown-up view of one example embodiment of a display having cooling air channels integrated in a bezel structure to provide cooling airflow at the periphery of an OLED film.

Referring now to FIG. 7, a blown-up view depicts one example embodiment of a display 32 having cooling air channels 78 integrated in a bezel structure to provide cooling airflow at the periphery of an OLED film. In the example embodiment, midframe 78 has cooling channels 78 etched in front and rear face surfaces. Cooling channels 78 are defined by capturing midframe 72 with a bezel 84 on each of the front and rear faces. In alternative embodiments, cooling channels 78 may be formed in the bezel 84 against a smooth midframe 72 surface, or may be formed with a combination of cooling channels 78 formed in both midframe 72 and bezels 84. In one example embodiment, rather than having a bezel 84, outer glass 70 may couple over midframe 72 to define cooling channels 78. In the example embodiment of FIG. 7, cooling channels 78 formed on the front and rear faces of display 32 define front and rear cooling paths 80 that provide airflow in opposite directions, such as clockwise airflow in the front face and counterclockwise airflow in the rear face. Airflow direction may be selected in each cooling path 80 based upon thermal conditions of display 32, such as by monitoring thermal conditions sensed within display 32.

Figure 8:
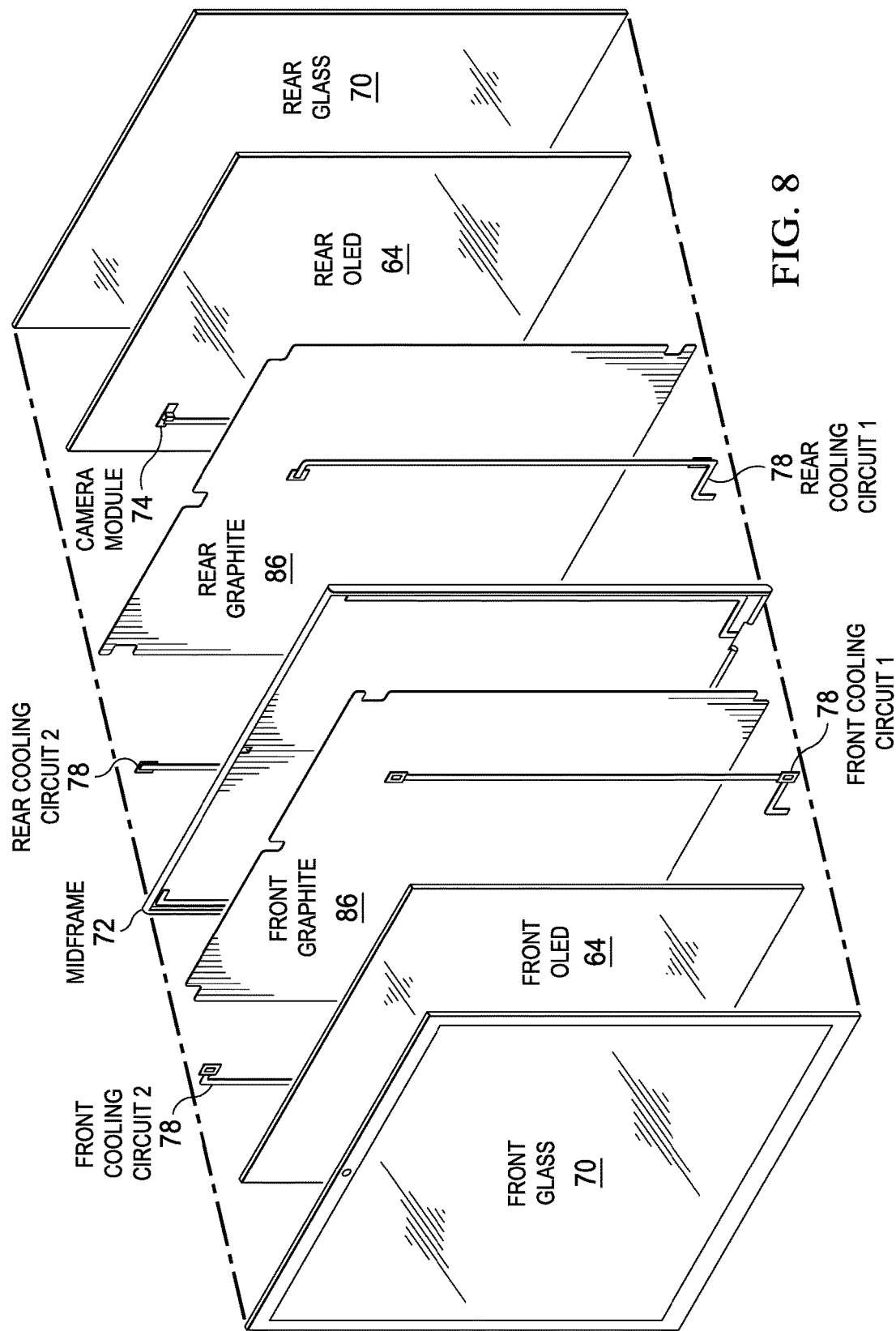
FIG. 8 depicts a blown up view of a display having embedded cooling and camera functionality.

Referring now to FIG. 8, a blown up view depicts a display 32 having embedded cooling and camera functionality. Display 32 has a two-sided presentation of visual images with a front and rear OLED film 64, each OLED film 64 protected by an outer glass covering 70. A central midframe 72 supports films 64, such as with the laminate substrate described above. In order to dissipate excess thermal energy, a graphite layer 86 is disposed behind each OLED film 64 and interfaced with a cooing circuit 78 that transfers thermal energy, such as with a cooling airflow provided by a piezoelectric device as discussed above. A camera module 74 integrates with the display structure, such as by integration with midframe 72 or glass 70. In the example embodiment, the outer periphery or OLED film 64 on each face of display 32 is hidden with etched glass or paint to create a virtual bezel that hides wiring to support camera 74 and the path of cooling circuit 78. Alternatively, a bezel may couple around the peripheral of OLED film 64 to protect the edges of glass 70. In one example embodiment, OLED film 64 has a transparent characteristic so that midframe 72 is composed of transparent material.

Although the present invention has been described in detail, it should be understood that various changes, substitutions and alterations can be made hereto without departing from the spirit and scope of the invention as defined by the appended claims.

What is claimed is:

1. A portable information handling system comprising:
a housing;
a processor disposed in the housing and operable to execute instructions to process information;
a memory disposed in the housing and interfaced with the processor, the memory operable to store the information;
a graphics processor operable to selectively send visual information to present visual images at pixels of a display and to selectively turn off presentation of visual images at the pixels by withholding visual information from presentation at the pixels;
an OLED display integrated in the housing and interfaced with the graphics processor, the OLED display operable to present the information as visual images and having control wires interfaced with pixels to communicate signals to the pixels that generate the visual images;
plural antenna wires integrated with the OLED display at plural locations, the plural antenna wires aligned to pass across the display with the control wires; and
a radio interfaced with the plural antenna wires, the radio having a multiple input multiple output (MIMO) controller operable to communicate wireless signals from the plural antenna wires in a MIMO configuration;
wherein the graphics processor selects less than all pixels of the display at which to disable the presentation of visual information based upon activity at the antenna wires, the disabled visual information associated with control wires that are proximate to but separate from the antenna wires to reduce signal interference between the control wires and the antenna wires.

2. The portable information handling system of claim 1 wherein the plural antenna wires comprise silver nanowires.

3. The portable information handling system of claim 1 wherein the housing comprises a main portion rotationally coupled to a lid portion, and the display comprises an OLED film disposed at both a front face and a rear face of the lid portion.

4. The portable information handling system of claim 3 wherein the plural antenna wires comprise at least one antenna wire disposed with a control wire on the front face and at least one antenna wire disposed with a control wire on the rear face.

5. The portable information handling system of claim 1 further comprising:
a thin film transistor (TFT) touch surface disposed on the display to detect end user touches; and
a touch controller interfaced with the TFT touch surface and operable to control operation of the TFT touch surface;
wherein the touch controller selectively disables the TFT touch surface proximate the plural antenna wires based upon activity at the plural antenna wires to reduce interference between the plural antenna wires and the touch surface.

6. The portable information handling system of claim 5 wherein the activity at the plural antenna wires comprises selection of the plural antenna wires to receive wireless signals in a MIMO configuration.

7. The portable information handling system of claim 1 wherein the activity at the antenna wires comprises selection of the antenna wires to receive wireless signals in a MIMO configuration.

* * * * *